United States Patent
Carillo

(10) Patent No.: US 7,950,835 B2
(45) Date of Patent: May 31, 2011

(54) BICYCLE SAFETY LIGHTING

(76) Inventor: James Carillo, Long Beach, CA (US)

( * ) Notice: Subject to any disclaimer, the term of this patent is extended or adjusted under 35 U.S.C. 154(b) by 353 days.

(21) Appl. No.: 12/210,963

(22) Filed: Sep. 15, 2008

(65) Prior Publication Data

US 2009/0010015 A1 Jan. 8, 2009

Related U.S. Application Data

(63) Continuation-in-part of application No. 11/810,604, filed on Jun. 6, 2007, now Pat. No. 7,722,231.

(60) Provisional application No. 60/812,056, filed on Jun. 8, 2006.

(51) Int. Cl.
*B62J 6/00* (2006.01)

(52) U.S. Cl. ........ 362/473; 362/476; 362/483; 362/500; 280/288.4; 280/301; 340/432

(58) Field of Classification Search ............... 362/473, 362/476, 483, 500; 280/288.4, 301; 340/432
See application file for complete search history.

(56) References Cited

U.S. PATENT DOCUMENTS

| | | | |
|---|---|---|---|
| 3,696,334 A | 10/1972 | Demeter | |
| 4,049,959 A | 9/1977 | Ledterman | |
| 4,085,317 A | 4/1978 | Mithoff | |
| 4,309,741 A | 1/1982 | Smith | |
| 4,623,954 A | 11/1986 | Schott et al. | |
| 5,040,099 A | 8/1991 | Harris | |
| 5,072,339 A | 12/1991 | Shimojo | |
| 5,276,593 A * | 1/1994 | Lighthill et al. | 362/473 |
| 6,158,881 A | 12/2000 | Carne | |
| 6,572,249 B2 * | 6/2003 | Bailey | 362/473 |

* cited by examiner

*Primary Examiner* — Ali Alavi
*Assistant Examiner* — Mary Zettl
(74) *Attorney, Agent, or Firm* — Kenneth L. Green

(57) ABSTRACT

A bicycle or moped lighting system projects light onto a rider's moving legs to make the rider more visible to motor vehicle operators and thereby improve the rider's safety. A single safety light fixture is mounted below the bicycle seat and directs diverging light beams towards the backs of both of the rider's legs. While peddling, the motion of the lighted legs attracts the attention of the motor vehicle operators thereby improving rider visibility. A second light fixture may reside ahead of the rider to direct diverging light beams onto the fronts of the rider's moving legs.

12 Claims, 5 Drawing Sheets

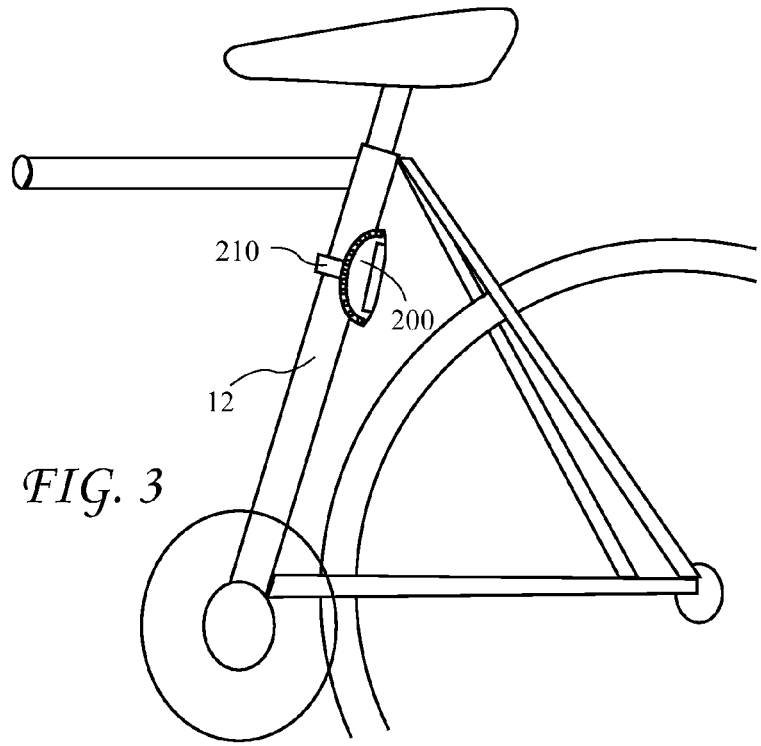
FIG. 3
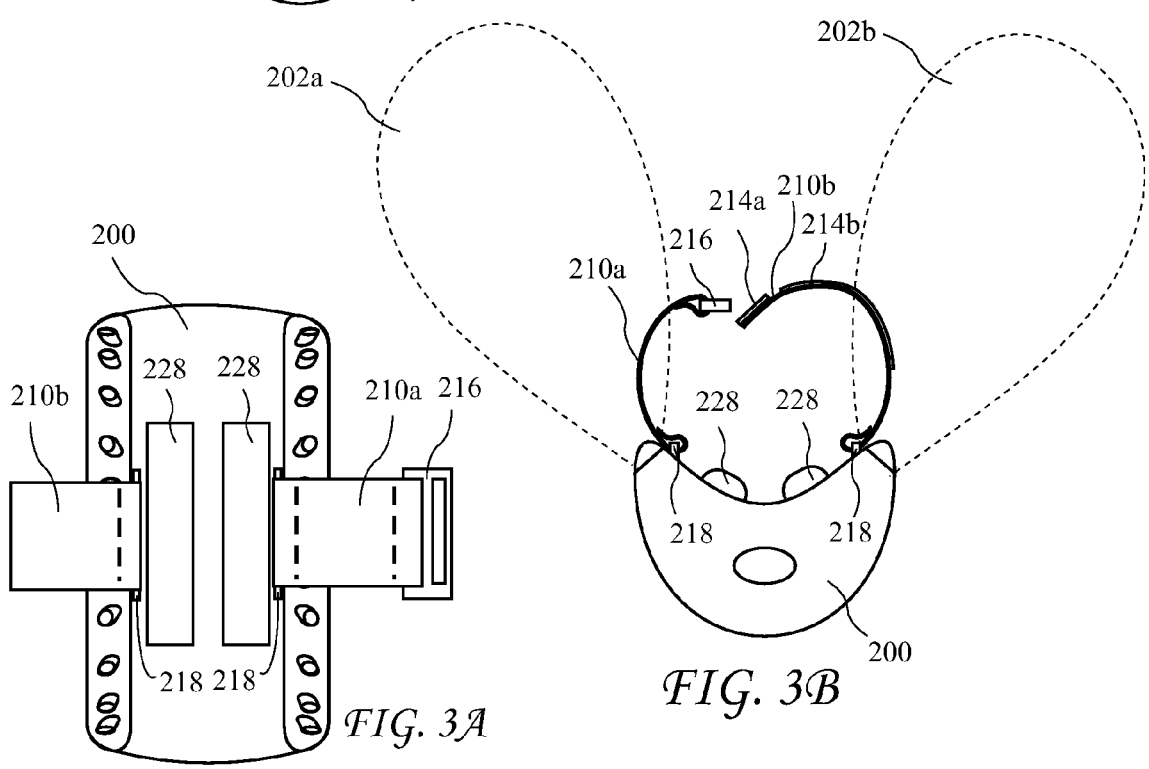
FIG. 3A
FIG. 3B

BICYCLE SAFETY LIGHTING

The present application is a Continuation in Part of U.S. patent application Ser. No. 11/810,604 filed Jun. 6, 2007 now U.S. Pat. No. 7,222,231 which claims the benefit of U.S. Provisional Application Ser. No. 60/812,056, filed Jun. 8, 2006, which applications are incorporated in their entirety herein by reference.

BACKGROUND OF THE INVENTION

The present invention relates to bicycle safety and in particular to bicycle safety lighting.

Bicycle riding has been both a form of transportation and recreation for many years and in many parts of the world. When such riding occurs in low light and/or dark conditions the safety of the rider depends upon the rider's ability to see the road surface ahead and more importantly being able to be seen by motor vehicle operators using the road. This invention addresses the safety need to be seen by motor vehicle operators.

Various safety devices, generally comprising reflectors and/or lights, are known and used by bicycle riders. Most bicycles are sold with reflectors, however such reflectors are small and depend on light being directed towards them. Both forward facing and rearward facing lights are also common, and are generally mounted on or near handle bars, or under the bicycle seat. While such lights provide some added visibility to the rider, it is often not sufficiently conspicuous to motor vehicle operators.

Several attempts have been made to provide an elevated lighting for bicycles based on the belief that a higher light is more visible. Such elevated devices are described in U.S. Pat. Nos. 4,049,959, and 4,309,741. Unfortunately, while these are intuitively attractive, in practice they have failed to gain acceptance, possibly because of the ungainly appearance, and because they do not provide a significant improvement in visibility compared to existing lights.

Other attempts have been made to provide safety lighting to improve the visibility of motorcycle riders. U.S. Pat. No. 5,072,339 discloses a light residing towards the rear of motorcycle seating, which light illuminates a rider's back to improve visibility. Unfortunately, such lighting fails to illuminate an easily identifiable portion of the rider, especially when the rider is leaning forward on the handle bars, and is not likely to cause a motor vehicle operator to immediately identify the rider and provide increased safety.

U.S. patent application Ser. No. 11/810,604 filed Jun. 6, 2007 by the present applicant addresse many of the needs identified above by providing lights mountable to the bicycle frame behind the rider's legs to direct light beams onto the rider's moving legs. The illumination of the rider's moving legs attracts the attention of motor vehicle operators and thereby significantly improves rider safety. While the '604 application provides a good solution to rider safety, some riders may prefer a simple single device over the two lights disclosed in the '604 application.

BRIEF SUMMARY OF THE INVENTION

The present invention addresses the above and other needs by providing a bicycle, moped, or electric bicycle lighting system which projects light onto a rider's moving legs to make the rider more visible to motor vehicle operators and thereby improve the rider's safety. A single safety light fixture is mounted below the bicycle seat and directs diverging light beams towards the backs of both of the rider's legs. While peddling, the motion of the lighted legs attracts the attention of the motor vehicle operators thereby improving rider visibility. A second light fixture may reside ahead of the rider to direct diverging light beams onto the fronts of the rider's moving legs.

In accordance with one aspect of the invention, there is provided a bicycle and safety lighting system. The safety lighting system includes a single safety light fixture producing horizontally diverging light beams, the safety light fixture mounted to the bicycle and configured to illuminate a rider's legs while the rider is sitting on the bicycle seat and peddling the bicycle.

In accordance with another aspect of the invention, there is provided a bicycle safety light fixture including a housing and columns of light elements. The housing has a horizontal cross-section with forward and outward horizontally diverging arms angularly spaced apart in azimuth and on each side of a concave mouth. The arms have a convex "D" shaped vertical profile, with the rounded faces of the "Ds" facing forward. The columns of light elements are curved columns of vertically spaced apart light elements on the forward facing rounded faces of the "Ds", and comprise at least four light elements pointing in different elevation angles to provide a broad vertical illumination including downward illumination. A lens covers the column of light elements on each arm and the safety light fixture produces two horizontally diverging beams of light.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 shows a more detailed view of the safety light fixture mounted behind the seat tube.

FIG. 3A is a front view of the safety light fixture according to the present invention.

FIG. 3B is a top view of the safety light fixture according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
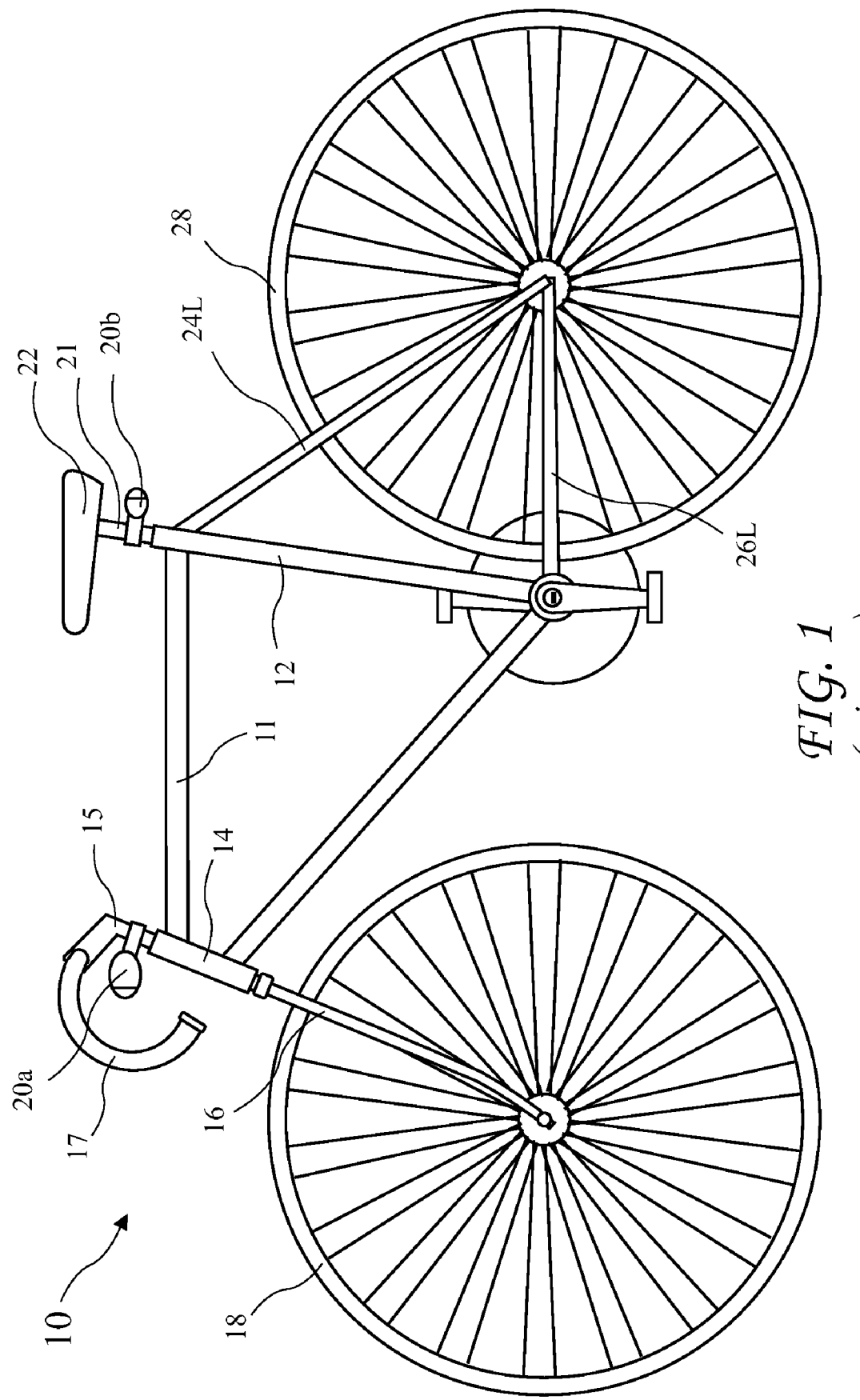
FIG. 1 is a prior art bicycle.

A prior art bicycle 10 is shown in FIG. 1. The bicycle 10 includes a frame including a top tube 11, a seat tube 12, a steering head 14, seat stay 24L and chain stay 26L. A fork 16 is rotatably mounted to the steering head 14, and handlebars 17 are mounted to the frame and fork 16 by a stem 15. A seat 22 is mounted to the seat tube 12 of the frame by a seat post 21. A front light 20a is mounted to the stem 15 and a rear light 20b is mounted to the seat post 21. While the front light 20a and rear light 20b provide some visibility to the bicycle 10, motor vehicle operators still often fail to see and identify a bicycle and rider at night and in low light conditions. Further, a common "point like" rear light 20b may provide no indication of distance to motor vehicle operators.

Figure 2:
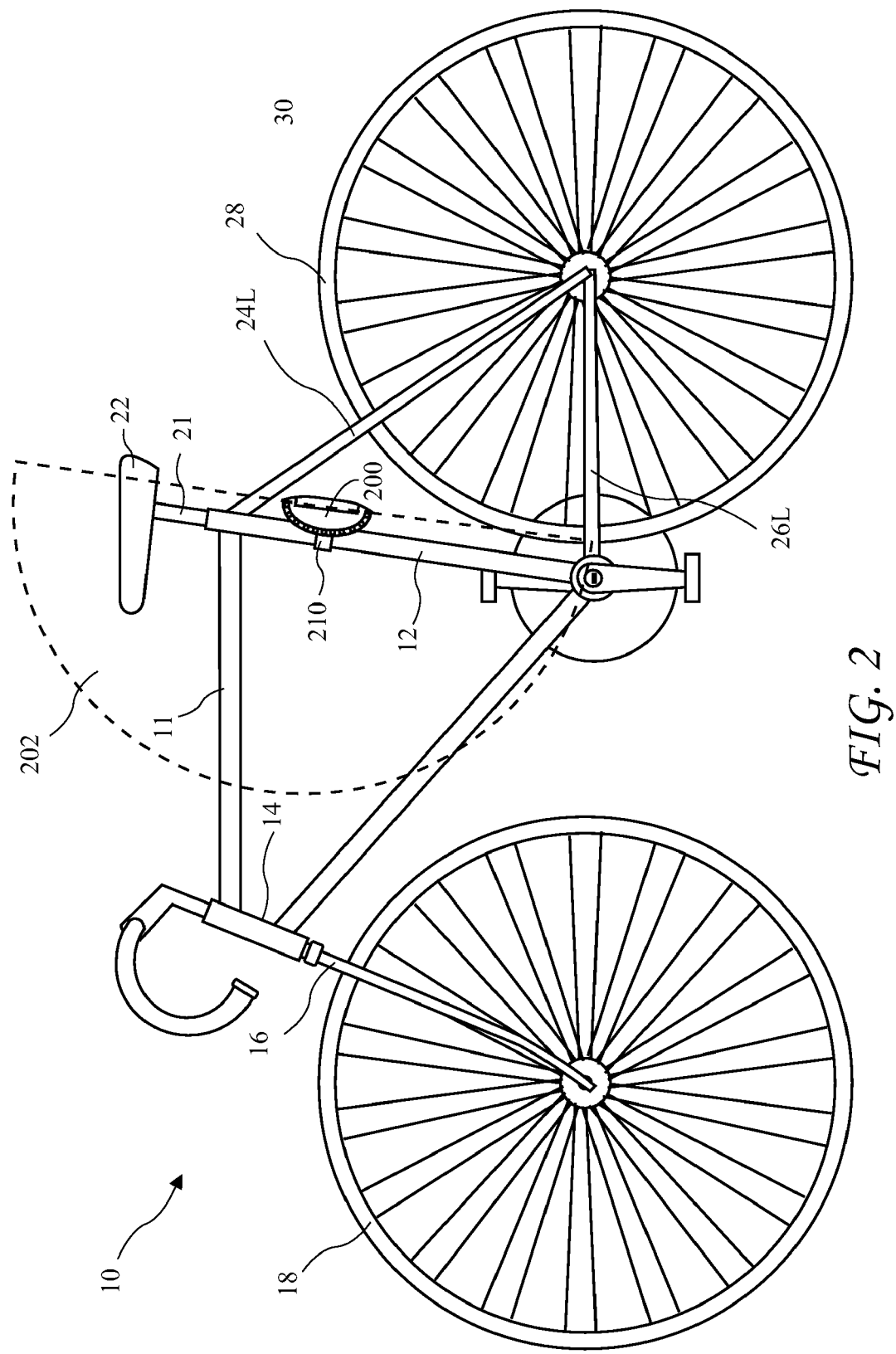
FIG. 2 is a side view of the bicycle and a safety light system with a single beam safety light fixture according to the present invention, attached behind a seat tube.

A side view of the bicycle 10 and a safety light system according to the present invention is shown in FIG. 2 and in a more detailed view in FIG. 3. The safety lighting system according to the present invention includes a safety light fixture 200 mounted below the seat 22 and behind the axis of the seat post 21 and/or the seat tube 12. The safety light fixture 200 includes at least two light elements 224 (see FIGS. 4A and 4B) which produce at least two horizontally diverging beams 202a and 202b of light having downward, forward, and upward components. The safety light fixture 200 is preferably mounted to the seat tube 12 or the seat post 21, but may be mounted to the seat tube 12, the seat post 21, the seat 22, the top tube 11, seat rails, a saddle bag attached to the seat rails, seat post, or seat, rear rack or bag attached to seat stays, axle, chain stays, or the seat post, a rear fender, or to any feature of the bicycle 10 allowing the light beams of the safety light fixture 200 to be directed towards a rider's legs, and preferably towards the backs of the rider's legs. The safety light fixture 200 is preferably attached by a strap 210. While the safety light fixture is shown attached using a strap, any single safety light fixture producing two horizontally diverging light beams to illuminate both of a rider's moving legs is intended to come within the scope of the present invention. For example, the safety light fixture may also be attached by a strap or a clamp to the bottom of the seat 22 and illuminate the rider's legs.

A front view of the safety light fixture 200 with the strap 210 according to the present invention is shown in FIG. 3A and a top view of the safety light fixture 200 with the strap 210 according to the present invention is shown in FIG. 3B. The strap 210 comprises a first strap portion 210a and a second strap portion 210b, both attached to slotted features 218 of the safety light fixture 200. The first strap portion 210a includes a buckle 216. The second strap 210b includes cooperating hook and loop material 214a and 214b. The concave front face of the safety light fixture 200 includes two strips of gripping material 228 to prevent or reduce slipping on the safety light fixture 200 when attached to the bicycle 10. Each of the two strips of gripping material 228 may be replace by two or more smaller pieces of gripping material, for example, by two or more, about one half inch diameter, pieces of gripping material.

The safety light fixture 200 is attached to the bicycle 10 by holding the safety light fixture 200, and specifically the gripping material 228, against a bicycle 10 surface (preferably a cylindrical surface) and attaching the first strap portion 210a and the second strap portion 210b around the surface and looping the end of the second strap portion 210b through the buckle 216 and pressing the cooperating hook and loop material 214a and 214b against each other. The two strips of gripping material 228 are preferably a silicone material and preferably at least 32.5 mm high and approximately 10 mm wide with a rounded cross-section.

Figure 4D:
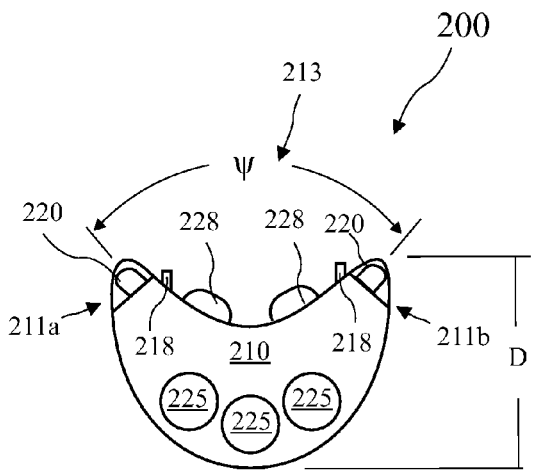
FIG. 4D is a horizontal cross-section of the single safety light fixture according to the present invention taken along line 4D-4D of FIG. 4A.
Figure 4E:
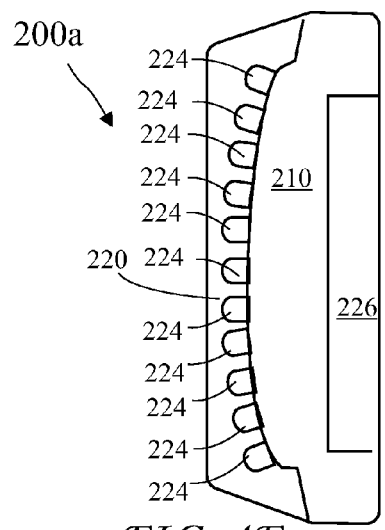
FIG. 4E is a left side view of a second embodiment of the safety light fixture according to the present invention.
Figure 4A:
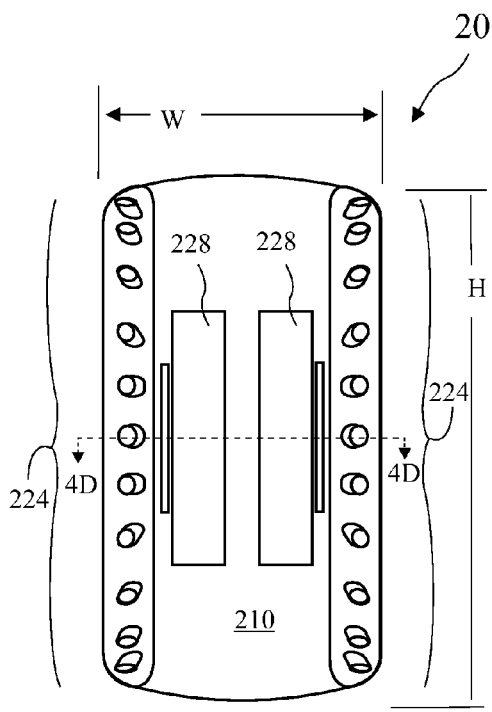
FIG. 4A is a front view of the safety light fixture according to the present invention.
Figure 4B:
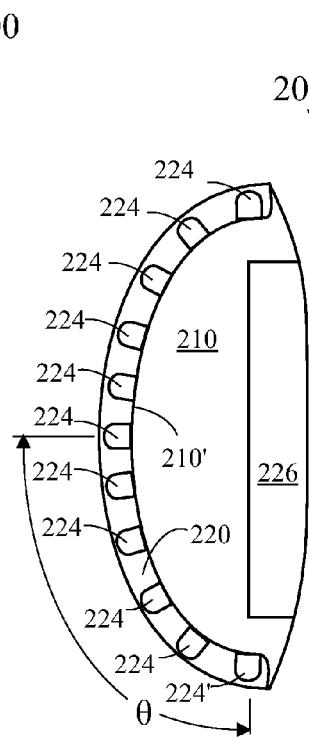
FIG. 4B is a left side view of the safety light fixture according to the present invention.
Figure 4C:
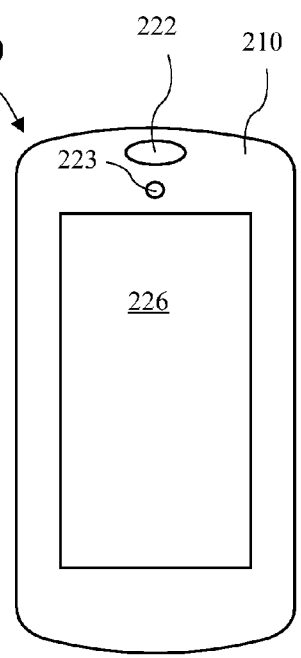
FIG. 4C is a rear view of the safety light fixture according to the present invention.

A front view of the safety light fixture 200 according to the present invention is shown in FIG. 4A, a left side view of the safety light fixture 200 according to the present invention is shown in FIG. 4B, a rear view of the safety light fixture 200 according to the present invention is shown in FIG. 4C, and a horizontal cross-sectional view of the safety light fixture 200 according to the present invention taken along line 4D-4D of FIG. 4A is shown in FIG. 4D. The safety light fixture 200 has a housing 210 with a height H, a width W and a depth D. The height H is preferably approximately five inches, the width W is preferably approximately three inches, and the depth D is preferably approximately 2½ inches. The horizontal cross-section of the housing 210 (see FIG. 4D) is arced with a concave mouth 213 and left and right arms 211a and 211b of the arc on each side of the mouth 213 facing forward. The arms 211a and 211b preferably have a convex "D" shaped vertical profile seen best in FIG. 4B and angularly spaced apart in azimuth $\psi$ as best seen in FIG. 4D and light elements 224 reside on rounded faces 210' of the "Ds" facing forward. A curved column of light elements in each arm follows the vertical convex "D" shape of each arm.

Lenses 220 cover the forward edge of each arm 211a, 211b of the housing 210 and light elements 224 reside in columns behind the lenses 220. A lower most light element 224' is pointed down at an elevation angle $\theta$ between 30 and 105 degrees from the horizontal, and the light elements in each column are preferably elevationally spaced apart (i.e., pointed at different elevations or vertical angles) although consecutive pairs or triples of light elements may be pointed in the same vertical direction. Depending on the mounting location of the safety light fixture 200, various of the light elements 224 and 224' provide forward, upward, and/or downward illumination to illuminate a rider's moving legs to attract the attention of motor vehicle operators thereby improving rider visibility and safety. A preferred embodiment of the safety light fixture 200 includes between four and twelve light elements 224 on each arm 211a and 211b of the safety light fixture 200, and more preferably eight light elements 224 on each arm 211a and 211b of the safety light fixture 200.

The light elements 224 may be vertically symmetrical or asymmetrical with the light elements 224 vertically spaced apart on each arm 221a and 211b and wrapping around each arm 221a and 211b thereby pointing down, foreward, and up producing a 180 degree vertical beam pattern. The left and right arms 211a and 211b are also angularly spaced apart in azimuth angle $\gamma$ to form a horizontally diverging "V" shaped light pattern thereby illuminating both legs with a single safety light fixture. The azimuth angle $\psi$ is preferably between approximately 30 degrees and approximately 120 degrees and more preferably approximately 90 degrees. The light elements 224 are preferably Light Emitting Diodes (LEDs) having white 9000 millicandles (MCDs) and 20 to 60 degree beamwidths.

While a preferred embodiment of the present invention shown in FIGS. 4A-4B has two columns of vertically spaced apart light elements providing 180 degrees of vertical coverage, any single safety light fixture providing diverging light beams and mounted to a bicycle to direct light towards a rider's legs is intended to come within the scope of the present invention.

An ON/OFF switch 222 resides near the top of the front side of the safety light fixture 200 and is preferably water proof, and more preferably sealed by a silicone seal. An additional red LED 223 resides near the top of the safety light fixture 200. The safety light fixture 200 preferably is powered by batteries 225 housed inside the safety light fixture 200, and more preferably powered by three AA batteries. A battery door 226 on the front side of the safety light fixture 200 is opened to remove and replace the batteries. The batteries may also be rechargeable and may be recharged from a conventional wall outlet, from a PC USB port, from a solar panel, or from any suitable power source using an appropriate circuit.

Figure 5:
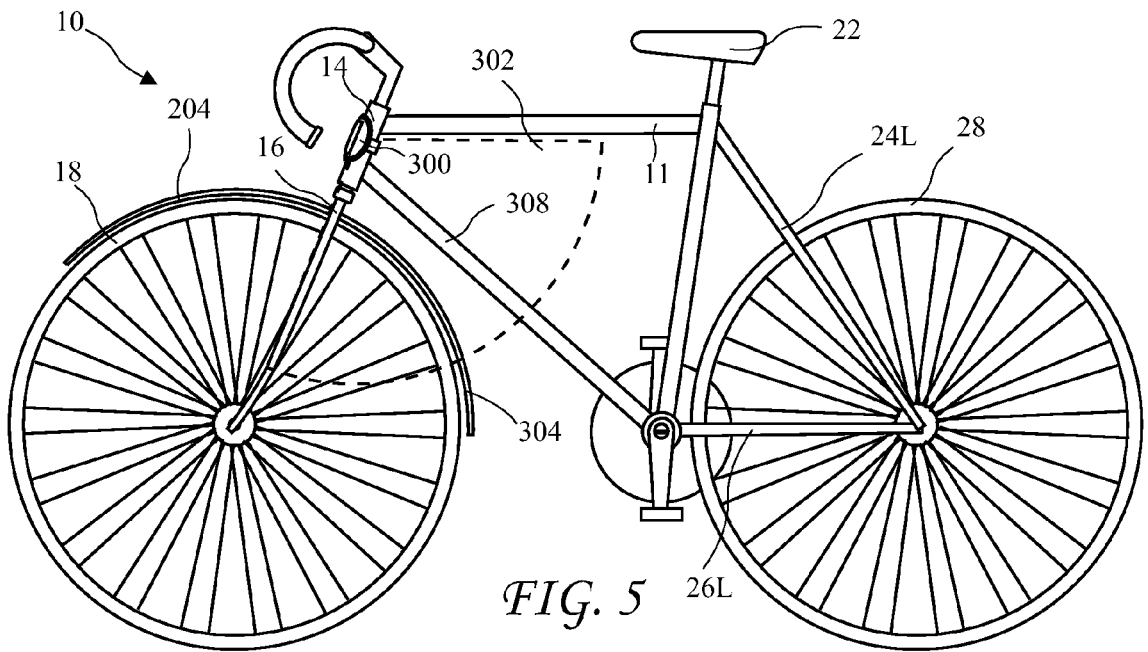
FIG. 5 is a side view of the bicycle and a safety light system with a second safety light fixture according to the present invention, attached to a steering head and illuminating fronts of a rider's legs.

A side view of a front mounted second safety light fixture 300 with a single beam safety light fixture according to the present invention, attached to a steering head 14 of the bicycle 10 as shown in FIG. 5. The back side of the safety light fixture 300 faces the fronts of the rider's legs to illuminate the rider's moving legs to attract the attention of motor vehicle operators thereby improving rider visibility and safety. The safety light fixture 300 is similar to the safety light fixture 200 but may includes features to mount to any forward member of the bicycle 10. The safety light fixture 300 may be mounted to the steering head 14, the fender 204, the top tube 11, the down tube 308, the handle bars 17, the stem 15, front mounted rack, or to any point in front of the rider using an appropriate bracket or strap where the safety light fixture 300 may direct illumination towards the fronts of the rider's legs.

A left side view of a second embodiment of the safety light fixture 200a according to the present invention is shown in FIG. 4E. The safety light fixture 200a is similar to the safety light fixture 200, except that the light elements 224 are in straight vertical columns, and do not have the convex "D" shaped vertical profile shown in FIG. 4B.

Figure 6:
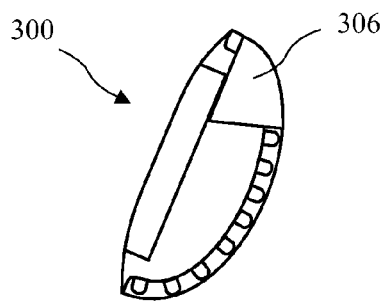
FIG. 6 is the second safety light fixture with a shade according to the present invention cover upper light elements of the second safety light fixture.

The second safety light fixture 300 with a shade 306 according to the present invention covering upper light elements of the second safety light fixture 300 is shown in FIG. 6. Because the safety light fixture 300 may be mounted to direct light towards the front of the rider's legs, in some mounting locations, the light may interfere with the rider's vision. To address this possibility, the safety light fixture 300 may be manufactured with a modified vertical beam pattern, or may be rider adjustable or modifiable to adjust the vertical beam pattern, or the shade 306 may be positioned over the upper light elements. The safety light fixture 300 is preferably mounted to the bicycle ahead of the rider and preferably adjusted to create light beams extending vertically from the horizontal the lowest travel of the bicycle pedals to illuminate fronts of the rider's legs while the rider is sitting on the seat and peddling the bicycle.

As seen by comparing FIG. 2 to FIG. 5, the safety light fixture 200 shown in FIGS. 4A-4D provides light over approximately a 180 degree vertical beam while the safety light fixture 300 provides less vertical beam coverage, and preferably the safety light fixture 300 provides vertical beam coverage no higher than the horizontal plane (i.e., −zero degrees) and down to −90 degrees, directed toward the toes of the rider toward the ground. Such wide vertical beam allows flexibility in mounting the safety light fixture 200 to the bicycle 10. The safety light fixture 300 may also be attached to a range of points along a front fender 204 or other locations and is manufactured or user modifiable to adjust the vertical beam coverage to still illuminate the rider's legs directed towards a rider's legs, without interfering with the rider's vision. Such versatility allows use of a single safety light fixture with horizontally diverging light beams on a variety of bicycles and at positions preferred by a variety of riders.

While the invention herein disclosed has been described by means of specific embodiments and applications thereof, numerous modifications and variations could be made thereto by those skilled in the art without departing from the scope of the invention set forth in the claims.

I claim:

1. A bicycle and safety lighting system comprising;
    a bicycle;
    a bicycle frame;
    a bicycle seat attached to the bicycle frame; and
    a single safety light fixture producing horizontally diverging light beams, the safety light fixture mounted to the bicycle and configured to illuminate a rider's legs while the rider is sitting on the seat and peddling the bicycle, wherein:
    the safety light fixture is mounted to the bicycle to one of a front fender, a top tube, a down tube, a steering head, handle bars, a stem, a front mounted rack, and a pannier, and ahead of the rider to create light beams extending vertically from the horizontal to the lowest travel of the bicycle pedals to illuminate fronts of the rider's legs while the rider is sitting on the seat and peddling the bicycle; and
    the safety light includes an adjustable shade to adjust the vertical height of the light beams to avoid blinding the rider.

2. The bicycle and safety lighting system of claim 1, further including a second safety light fixture attached behind and below the seat creating second horizontally diverging light beams pointing forward to illuminate backs of the rider's legs while the rider is sitting on the seat and peddling the bicycle.

3. The bicycle and safety lighting system of claim 2, wherein the second safety light fixture is attached to one of a seat tube, a seat post, the seat, a top tube, seat rails, a saddle bag attached to the seat rails, a seat post, a rear rack, a rear fender, and a rear bag attached to one of seat stays, a rear axle, chain stays, and the seat post.

4. The bicycle and safety lighting system of claim 2, wherein;
    the bicycle frame including a seat tube and the seat is attached to the bicycle by a seat post inserted into the seat tube; and
    the second safety light fixture is attached behind one of the seat tube and the seat post above the pedals creating second horizontally diverging light beams pointing forward.

5. The bicycle and safety lighting system of claim 2, wherein the second safety light fixture includes two angularly spaced apart and horizontally diverging forward facing arms and a vertical column of the light elements residing vertically spaced apart on each arm to produce second horizontally diverging light beams.

6. A bicycle safety light fixture comprising:
    a housing having a horizontal cross-section with forward and outward horizontally diverging arms angularly spaced apart in azimuth and on each side of a concave mouth, the arms having a convex "D" shaped vertical profile, rounded faces of the "Ds" facing forward;
    curved columns of vertically spaced apart light elements on the forward facing rounded faces of the "Ds", the light elements comprising at least four light elements pointing in different elevation angles to provide a broad vertical illumination including downward illumination; and
    a lens covering the column of light elements on each arm, the safety light fixture producing two horizontally diverging beams of light.

7. The bicycle safety light fixture of claim 6, further including a strap for attaching the safety light fixture to a bicycle.

8. The bicycle safety light fixture of claim 7, further including gripping material inside the concave mouth for preventing slipping when the light is mounted in the bicycle.

9. The bicycle safety light fixture of claim 6, wherein each column of light elements includes between four and twelve light elements per column.

10. The bicycle safety light fixture of claim 6, wherein the light elements produce light beams horizontally diverging between 30 and 120 degrees.

11. The bicycle safety light fixture of claim 10, wherein the light elements produce light beams horizontally diverging at approximately 90 degrees.

12. A bicycle and safety lighting system comprising;
a bicycle;
a bicycle frame;
a bicycle seat attached to the bicycle frame; and
a single safety light fixture mounted to the bicycle and producing horizontally diverging beams configured to illuminate a rider's legs while the rider is sitting on the seat and peddling the bicycle, the safety light fixture comprising:
a housing having a horizontal cross-section with forward and outward horizontally diverging arms angularly spaced apart in azimuth and on each side of a concave mouth, the arms having a convex "D" shaped vertical profile, rounded faces of the "Ds" facing forward;
curved columns of vertically spaced apart light elements on the forward facing rounded faces of the "Ds", the light elements comprising at least four light elements pointing in different elevation angles to provide a broad vertical illumination including downward illumination; and
a lens covering the columns of light elements on each arm.

* * * * *